Aug. 27, 1957  J. E. JOHANSSON ET AL  2,803,942
TWO-STROKE-CYCLE INTERNAL COMBUSTION ENGINES WITH
SCAVENGING AND CHARGING COMPRESSORS
DRIVEN BY EXHAUST GAS TURBINES
Filed Jan. 8, 1954  2 Sheets-Sheet 1

INVENTORS:
Johan Erik Johansson,
Uno Gerhard Kyrlin,

BY Pierce, Scheffler + Parker,
ATTORNEYS.

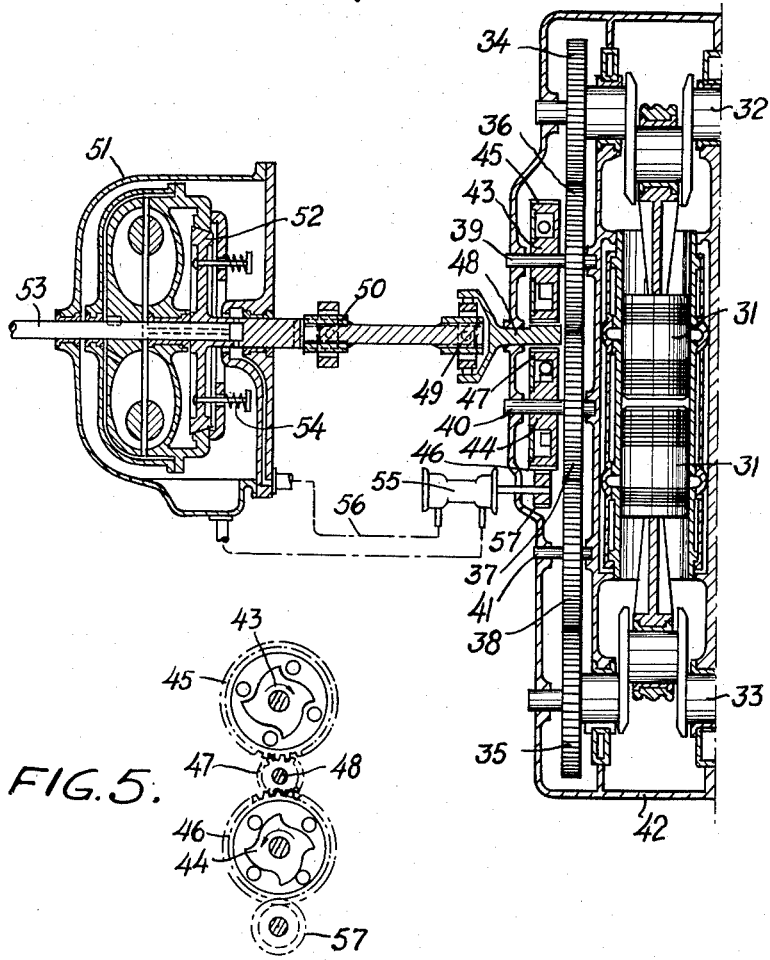
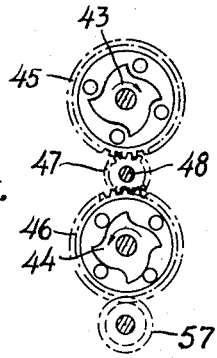

United States Patent Office 2,803,942
Patented Aug. 27, 1957

2,803,942

TWO-STROKE-CYCLE INTERNAL COMBUSTION ENGINES WITH SCAVENGING AND CHARGING COMPRESSORS DRIVEN BY EXHAUST GAS TURBINES

Johan Erik Johansson and Uno Gerhard Kyrlin, Goteborg, Sweden, assignors to Aktiebolaget Gotaverken, Goteborg, Sweden, a corporation of Sweden Application January 8, 1954, Serial No. 403,029

Claims priority, application Sweden January 13, 1953

5 Claims. (Cl. 60—13)

In a two-stroke-cycle internal combustion engine with a compressor driven by an exhaust gas turbine, the power of the exhaust gas turbine at a high load on the engine is sufficient to ensure satisfastory scavenging with the air delivered by the compressor. On the other hand, the scavenging will be unsatisfactory at a low load, whereas the compressor delivers an excess of air at a full load. To secure an improved scavenging effect in connection with a partial load and a low load it has been suggested to provide a mechanical transmission-gear between the engine shaft and the shaft of the compressor unit, whereby the number of revolutions of the latter becomes directly proportional to the number of revolutions of the engine. Hereby, with a high load and a full load, a transmission of energy will take place from the turbine unit to the engine shaft, but this may be avoided and the whole power of the turbine be made available for scavenging and charging of the motor, if a free-wheel contrivance is incorporated into the transmission-gear, said free-wheel contrivance permitting the compressor unit to run faster than corresponding to the ratio of gear in the transmission.

The present invention has for its object to improve the abovenamed arrangement, and the arrangement according to the invention is substantially distinguished by the provision, between the engine shaft and the shaft of the compressor unit, of a mechanical transmission-gear having a free-wheel contrivance and a slip coupling, preferably of the hydraulic type, incorporated into the same.

Figure 1:
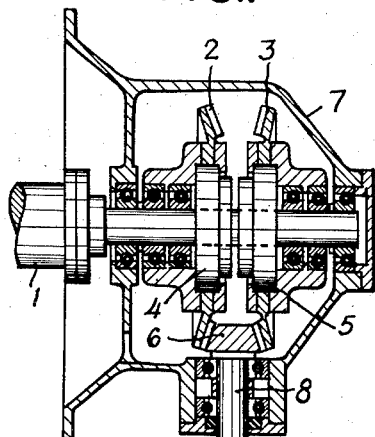
Figure 2:
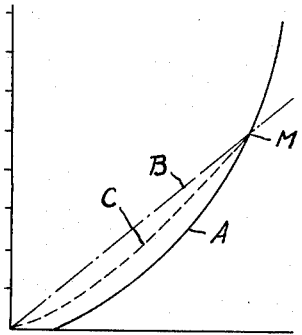
Figure 3:
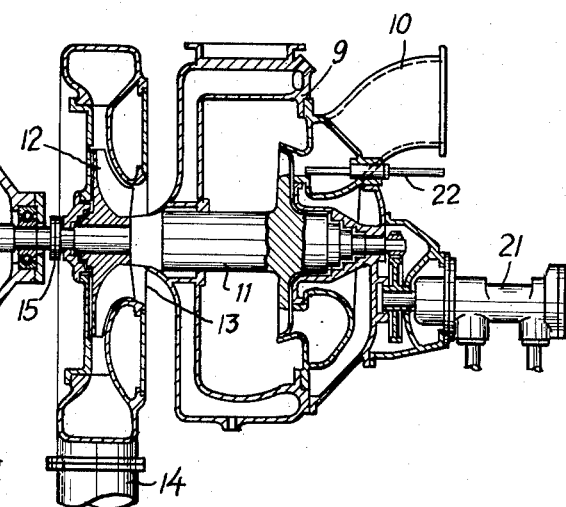
Figure 3:
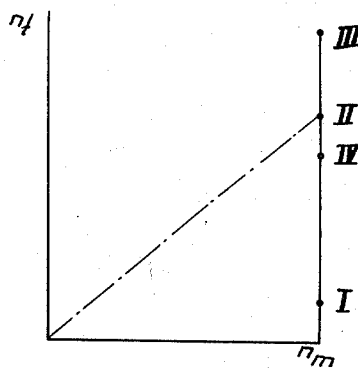

A few forms of embodiment of the invention will be described more closely with reference to the accompanying drawings. Fig. 1 shows a compressor unit pertaining to an internal combustion engine by way of diagrammatic representation, said compressor unit being combined with a transmission means from the crank shaft of the engine. Figs. 2 and 3 represent diagrams to elucidate the power obtained through the invention. Fig. 4 shows the invention as applied to a two-stroke-cycle engine with pistons working in opposite directions, and Fig. 5 is a diagrammatic detail view of two free-wheels incorporated in the arrangement according to Fig. 4.

In Fig. 1, 1 designates one end of the shaft of a two-stroke-cycle engine. Arranged on this shaft are two bevel pinions 2 and 3, which are mounted through the intermediary of free-wheel contrivances 4 and 5, respectively. The two bevel pinions 2 and 3 are in constant engagement with a bevel gear 6, and the arrangement is such that one of the pinions is a driving one, when the engine shaft 1 rotates in one direction, the other pinion then running freely, whereas conditions are reversed, when the engine rotates in the opposite direction.

The pinions 2 and 3 and the gear wheel 6 are arranged within a hood 7, which is rigidly connected to the engine frame, and protruding from this hood is the shaft 8 of the gear wheel 6, said shaft having, according to the above, one and the same direction of rotation disregarding the direction of rotation of the engine shaft 1.

A turbine is denoted by 9, said turbine being adapted to be driven by the exhaust gases of the internal combustion engine, which are supplied to the turbine through a pipe conduit 10. Arranged on the shaft 11 of the turbine, which projects out of the turbine casing, is a compressor wheel 12 of the centrifugal type. The inlet to the compressor wheel is designated by 13, and the outlet conduit, which is connected with the internal combustion engine in a manner not shown in this connection, is denoted by 14.

The shaft 11 of the compressor unit is connected to a shaft 16 by means of a rigid shaft coupling 15, a slip coupling 17 being connected between the coupling 15 and the shaft 16, said slip coupling being of the well-known hydraulic or electromagnetic type. The shaft 16 is connected with a shaft 19 by means of bevel gears 18, said shaft 19 being substantially coaxial with the shaft 8.

To avoid tensions in the transmission-gear such as tensions originating from the development of heat, inferior precision in mounting, and so forth, the shafts 8 and 19 are interconnected by means of a coupling element 20, which facilitates a certain relative movement between the shafts 8 and 19. Thus the coupling element 20 may comprise splines facilitating a certain axial relative movement between the shafts 8 and 19, and, furthermore, an arrangement with double universal joints, so that the shafts may also form a certain angle with one another or be laterally displaced.

Fig. 1 also indicates a hydraulic motor 21, for instance one of the helix type, adapted to drive the compressor unit over a gearing, besides which a conduit 22 with a nozzle is provided for the supply of compressed air, for example, directly to the wheels of the turbine 9. The object in view of these two arrangements is to show how the compressor unit may be started in different ways, so as to make it reach a certain number of revolutions, for instance 5 to 10% of the number of revolutions at full load, already before the internal combustion engine is started. Beyond the alternatives set forth, it is of course conceivable to provide an auxiliary driving means of the electric or pneumatic type. Such a starting device for the compressor unit is particularly suitable, inasmuch as it is possible by the same to avoid high torques in the transmission-gear at the starting of the internal combustion engine, which latter is obviously also easier to rotate by the starting air, where the compressor unit need not be accelerated. The free-wheel contrivance incorporated into the transmission-gear is of course understood to permit starting of the compressor unit in spite of the fact that the internal combustion engine is inoperative. Although such is not shown in the drawing, it might be found suitable to connect the auxiliary driving means to the compressor unit over a releasable coupling, a free-wheel or the like, so that the auxiliary driving means may be disconnected in normal operation.

Fig. 2 shows a diagram illustrating the number of revolutions $n_t$ of the compressor unit as a function of the number of revolutions $n_m$ of the internal combustion engine. Here, the curved full-drawn line A shows the compressor or turbine number of revolutions in connection with an operation by means of the exhaust gases alone. The chain-dotted line designated by B shows the compressor number of revolutions in connection with a mechanical operation of the compressor from the engine shaft. The two lines intersect each other at a point M, which with a certain ratio of gear between the engine and the compressor is located so that the power of the exhaust gas turbine 9 alone is sufficient to bring about the requisite scavenging effect. By incorporating a free wheel into the transmission it will be obtained at said point that the exhaust gas turbine alone takes over the operation of the compressor at increasing numbers of revolutions of the internal combustion engine, so that the transmission is relieved and the number of revolutions of the compressor unit is increased along the upward extension of the curve A. Hereby the scavenging and charging pressure will be increased more than if the compressor were mechanically connected to the engine, and for this reason the engine is capable of developing a greater power.

Within the range of the number of revolutions up to the point M, a somewhat too high number of revolutions of the compressor unit will be obtained with the rigid mechanical coupling between the engine and the compressor unit. Satisfactory scavenging with a partial load can be obtained also in connection with a somewhat lower number of revolutions of the compressor unit, and for this purpose the slip coupling 17 is incoporated into the transmission-gear. Owing to this coupling the number of revolutions will substantially follow the dashed line C, which involves a lowering of the power transmitted from the engine to the compressor unit within the range of the number of revolutions in consideration, which involves an improved economy.

Fig. 3 shows the number of revolutions of the compressor unit, when the engine operates at a constant number of revolutions under a varying load. Point I refers to the number of revolutions of the compressor unit when the engine is running idle, whereas point II refers to the number of revolutions of the compressor corresponding to point M in the diagram according to Fig. 2, that is to say, at a number of revolutions at which the scavenging of the engine is satisfactory. Point III corresponds to the number of revolutions of the compressor at full load on the engine. If, according to the above, the compressor unit is connected to the engine by means of a mechanical transmission-gear comprising a free-wheel, the number of revolutions of the compressor unit may increase from point II to point III at a varying load. Through the augmented number of revolutions of the compressor at an increased load, the scavenging and charging pressure is increased, as pointed out above, and the power of the engine can then be increased more than if the compressor had been mechanically conected to the engine. On the other hand, if in addition a slip coupling be incorporated into the transmission, the number of revolutions of the compressor unit, when the engine is running idle, will be that indicated by point IV. At an alteration of the load of the engine between idle running and full load the number of revolutions of the compressor will vary between points IV—III. The slipping of the slip coupling may then be selected of a value such that the number of revolutions IV of the compressor is the lowest permissible to provide for proper scavenging of the engine when running idle.

Fig. 4 shows the invention as applied to a two-stroke-cycle engine with pistons working in opposite directions, wherein the arrangement permits of a considerable simplification in comparison with that illustrated in Fig. 1. The engine is provided with the pistons 31 working in opposite directions, and has two separate crank shafts 32, 33 mutually connected by means of a gear transmission consisting of gear wheels 34 and 35, each on one of the crank shafts, and of three intermediate wheels 36—38 arranged on stub shafts 39—41 mounted on bearings in the housing 42 of the engine. The gear transmission 34—38 is necessary for the synchronization of the movements of the crank shafts 32, 33 and the pistons 31 and for the transmission of power between the shafts. The stub shafts 39 and 40 for the intermediate wheels 36 and 37, respectively, rotating in opposite directions are extended, and beside the intermediate wheels 36 and 37, parts 43 and 44 respectively of free-wheel clutches are rigidly connected with the shaft. The disconnectable parts of the free-wheel clutches are constituted by toothed rims 45 and 46, respectively, in constant engagement with a gear wheel 47 on a take-off shaft 48. The free-wheel clutches are one-way couplings, but since they are arranged on shafts rotating in different directions, the shaft 48 will be constantly driven in the same direction independently of the direction of rotation of the engine.

The shaft 48 extends over a couple of universal joints 49, 50 to a slip coupling 51 having preferably an overload coupling 52 incorporated into the same. The shaft 53 extending from the slip coupling 51 is connected to a shaft of an exhaust gas turbine (not shown) which in turn drives, together with the reciprocating engine, a compressor for charging and scavenging air for the reciprocating engine.

By the fact that the gear transmission 34—38 necessary for the synchronization of the crank shafts 32 and 33 is used for the operation of the shaft 48 of the exhaust gas turbine, no additional machine elements need be incorporated into the construction, for which reason the latter becomes very simple and safe in operation.

The slip coupling 51 is preferably of the hydraulic type, whereby alterations in the load will be equalized without shocks. Obviously, the coupling may be of some other type, for instance of the electromagnetic or pneumatic type.

The incorporated overload coupling 52 preferably consists of a coupling member rigidly connected with the input shaft, said coupling member having a conical friction surface cooperating with a corresponding conical surface connected to the pump wheel of the slip coupling. The friction surfaces are kept pressed against each other with the aid of springs 54 biased with a certain load, so that the coupling can only transmit a predetermined torque.

In an engine there are provided a plurality of auxiliary means, such as pumps for lubricating oil, supplying of fuel and the like, which should preferably rotate in one direction. However, should the engine be arranged to be reversed, the pumps will have to be provided with doubled sets of valves for their functioning, which complicates the construction. In the present case it will be found suitable to take the drive for certain auxiliary means, among these a pump 55 for oil under pressure to be supplied to the hydraulic coupling 51 in the transmission-gear via line 56, from a pinion 57 meshed with the toothed rim of one of the free wheel clutches such as rim 47 as shown in Figs. 4 and 5, the pinion 56 consequently always rotating in the same direction.

The invention is primarily intended to be applied in naval engines, but may of course also be used for other purposes. However, the invention is not limited to the example of embodiment described above and shown in the drawings, but may be varied in its details within the scope of the following claims.

What we claim is:

1. In a two-stroke internal combustion engine having an output shaft driven thereby, a scavenging and supercharging blower for said engine, an exhaust gas turbine driven by the exhaust gases from said engine and connected with the shaft of the blower, and means for transmitting power from the output shaft to the blower and comprising in combination a gear train, a slip coupling and a free-wheel clutch, said gear train having a gear ratio which will drive said blower at the same speed as driven by said turbine when the exhaust energy at a certain point of load on said engine is sufficient to supply the total air demands, the blower being driven through the gear train and by the turbine in combination in a first range of speed up to said point, and by the turbine alone in a second speed range beyond said point, said slip coupling being arranged to decrease the speed of the blower below that which would otherwise be caused by the gear train in the first speed range, and said free-wheel clutch being constructed to cut off the drive from the engine when the turbine alone is driving the blower to increase the speed thereof.

2. In a reversible two-stroke internal combustion engine having an output shaft driven thereby, a scavenging and supercharging blower for said engine, in exhaust gas turbine driven by the exhaust gases from said engine and connected with the shaft of the blower, and means for transmitting power from the output shaft to the blower and comprising in combination a gear train, a slip coupling and a double free-wheel clutch, said gear train having a gear ratio which will drive said blower at the same speed as driven by said turbine when the exhaust energy at a certain point of load on said engine is sufficient to supply the total air demands, the blower being driven through the gear train and by the turbine in combination in a first range of speed up to said point and by the turbine alone in a second speed range beyond said point, said slip coupling being arranged to decrease the speed of the blower below that which would otherwise be caused by the gear train in the first range of speed, and said double free-wheel clutch being constructed to give the blower a unidirectional drive independent of the rotary direction of the engine and to cut off the drive from the engine when the turbine alone is driving the blower to increase the speed thereof.

3. In a reversible two-stroke opposed piston internal combustion engine having two crank shafts interconnected by a gear train, a scavenging and supercharging blower for said engine, an exhaust gas turbine driven by the exhaust gases from said engine and connected with the shaft of the blower, and means for transmitting power from the engine to the blower and comprising in combination a second gear train, a slip coupling and a double free-wheel clutch, said second gear train having a gear ratio which will drive said blower at the same speed as driven by said turbine when the exhaust energy at a certain point of load on said engine is sufficient to supply the total air demands, the blower being driven through the gear train and by the turbine in combination in a first range of speed up to said point, and by the turbine alone in a second speed range beyond said point, said slip coupling being arranged to decrease the speed of the blower below that which would otherwise be caused by the gear train in said first speed range, one free-wheel clutch being provided on the shaft of each of two wheels of the first gear train rotating in opposite directions, each free-wheel clutch being provided with a toothed rim in engagement with a gear wheel in said second gear train, said free-wheel clutches being constructed to give the blower a unidriectional drive independent of the rotary direction of the engine and to cut off the drive from the engine when the turbine alone is driving the blower to increase the speed thereof.

4. In a two-stroke internal combustion engine having an output shaft driven thereby, a scavenging and supercharging blower for said engine, an exhaust gas turbine driven by the exhaust gases from said engine and connected with the shaft of the blower, and means for transmitting power from the output shaft to the blower and comprising in combination a gear train, a slip coupling, a free-wheel clutch and an overload clutch, said gear train having a gear ratio which will drive said blower at the same speed as driven by said turbine when the exhaust energy at a certain point of load on said engine is sufficient to supply the total air demands, the blower being driven through the gear train and by the turbine in combination in a first range of speed up to said point and by the turbine alone in a second speed range beyond said point, said slip coupling being arranged to decrease the speed of the blower below that which would otherwise be caused by the gear train in the first speed range, said free-wheel clutch being constructed to cut off the drive from the engine when the turbine alone is driving the blower to increase the speed thereof, and said overload clutch being provided on the shaft of the blower to restrict the torque transmitted through the free-wheel clutch.

5. In a reversible two-stroke opposed piston internal combustion engine having two crank shafts interconnected by a gear train, a scavenging and supercharging blower for said engine, an exhaust gas turbine driven by the exhaust gases from said engine and connected with the shaft of the blower, and means for transmitting power from the engine to the blower and comprising in combination a second gear train, a hydraulic slip coupling and a double free-wheel clutch, said second gear train having a gear ratio which will drive said blower at the same speed as driven by said turbine when the exhaust energy at a certain point of load on said engine is sufficient to supply the total air demands, the blower being driven through the gear train and by the turbine in combination in a first range of speed up to said point and by the turbine alone in a second speed range beyond said point, said hydraulic slip coupling being arranged to decrease the speed of the blower below that which would otherwise be caused by the gear train in said first speed range, one free-wheel clutch being provided on the shaft of each of two wheels of the first gear train rotating in opposite directions, each free-wheel clutch being provided with a toothed rim in engagement with a gear wheel in said second gear train, said free-wheel clutches being constructed to give the blower a unidirectional drive independent of the rotary direction of the engine and to cut off the drive from the engine when the turbine alone is driving the blower to increase the speed thereof, and a pump for feeding pressure oil to said slip coupling and being driven by the toothed rim of one of the free-wheel clutches.

References Cited in the file of this patent

UNITED STATES PATENTS

| | | |
|---|---|---|
| 1,516,734 | Johnson | Nov. 25, 1924 |
| 1,711,095 | Klimek | Apr. 30, 1929 |
| 2,019,745 | Swennes | Nov. 5, 1935 |
| 2,055,300 | Maurer | Sept. 22, 1936 |
| 2,146,369 | Dodge | Feb. 7, 1939 |
| 2,196,540 | Swennes | Apr. 9, 1940 |
| 2,278,181 | Lieberherr | Mar. 31, 1942 |
| 2,346,587 | Kilchenmann | Apr. 11, 1944 |
| 2,585,968 | Schneider | Feb. 19, 1952 |

FOREIGN PATENTS

| | | |
|---|---|---|
| 206,845 | Great Britain | Feb. 21, 1924 |
| 288,217 | Great Britain | June 14, 1928 |
| 488,396 | Great Britain | July 6, 1938 |